June 28, 1960 L. L. RIFKEN 2,942,899
COUPLING MEANS FOR BUILDING SCAFFOLDS, RACKS,
FRAMEWORKS, AND THE LIKE Filed Oct. 8, 1959 2 Sheets-Sheet 1

INVENTOR.
Louis L. Rifken,
BY Max R. Franc
Attorney.

June 28, 1960 L. L. RIFKEN 2,942,899
COUPLING MEANS FOR BUILDING SCAFFOLDS, RACKS,
FRAMEWORKS, AND THE LIKE
Filed Oct. 8, 1959 2 Sheets-Sheet 2

INVENTOR.
Louis L. Rifken.
BY Max R. Fraus
Attorney.

United States Patent Office 2,942,899
Patented June 28, 1960

2,942,899

COUPLING MEANS FOR BUILDING SCAFFOLDS, RACKS, FRAMEWORKS, AND THE LIKE

Louis L. Rifken, 122 S. Grove, Elgin, Ill.

Filed Oct. 8, 1959, Ser. No. 845,145

5 Claims. (Cl. 287—54)

This invention relates to improvements in coupling means for building scaffolds, racks, frameworks and the like.

One of the objects of this invention is to provide improved coupling means or clamping members for use in readily setting up tubular frameworks, such as scaffolds, racks, tables, shelving and the like, which provides for such structure having the rigidity and strength approximating that of a permanent structure, but which may be quickly and readily assembly and disassembled.

Another object of this invention is to provide a coupling unit consisting essentially of two members which are secured together, each member having a pair of jaws disposed so that one jaw is substantially at right angles to the other jaw, with the jaws being at opposite ends of the member, each jaw having two concave clamping surfaces with one clamping surface of each jaw extending longitudinally of the member and the axes of both of said longitudinally concave surfaces being coincident; the other of said concave clamping surfaces of each jaw extending transversely of said longitudinal surfaces, with the axis of one transverse surface of one jaw being at right angles to the axis of the other transverse surface of the other jaw, and the axis of each transverse clamping surface intersecting the axis of the longitudinally extending clamping surface of the jaws.

Another object of this invention is to provide a coupling unit formed preferably of two members and a fastening member for securing same together, said members each having a pair of jaws, each jaw having two concave inner clamping surfaces with one of said concave inner surfaces extending longitudinally of the member and the other inner concave surfaces extending transversely of the member so that when the two members are joined to form a coupling unit the cooperating pairs of jaws will clamp a tubular member either longitudinally or transversely of the unit.

Other objects will become apparent as this description progresses.

Figure 1:
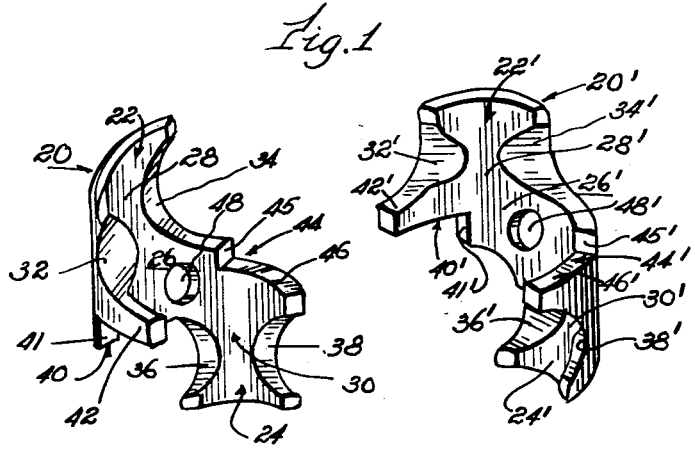
Figure 1 is an exploded view of the two members forming the coupling unit.

The device, as shown in Figures 1 to 9 inclusive comprises a pair of members designated by the numerals 20 and 20′, both of which are of identical construction. These members are adapted to be coupled together as shown in the drawings and presently to be described. Since both members are of identical construction, member 20 will be described in detail, with the same part in member 20′ being designated by the same numeral primed.

Member 20 is integrally formed and consists essentially of two jaw members 22 and 24, with an intermediate portion 26. Jaw member 24 is disposed substantially at right angles to jaw member 22, with the jaw members at opposite ends of the member. The exterior surface of member 20 is generally circular. The upper jaw 22, as shown, has an inner concave clamping surface 28 on substantially the same radius as the tubular member that will be inserted therein.

The concave clamping surface 28 extends longitudinally of member 20 and continues with the intermediate portion 26, as well as the inner concave clamping surface 30 of the lower jaw 24, all of said concave surfaces being on substantially the same radius and extending longitudinally of member 20. The axes of said longitudinally extending concave clamping surfaces 28 and 30 are coincident.

The upper jaw 22 also has a pair of spaced concaved inner clamping surfaces 32 and 34 extending transversely of the longitudinally extending concave surface 28 of jaw 22, with each spaced transversely extending concaved surface 32 and 34 adjacent the opposite sides of the upper jaw. The axes of the transversely extending surfaces 32 and 34 are coincident. The transversely extending concave surfaces 32 and 34 are substantially on the same radius as the longitudinally extending concave surfaces, except that they extend transversely thereof.

The lower jaw 24 previously referred to likewise has a pair of spaced transversely extending concaved surfaces 36 and 38, with each spaced transversely extending concaved surface adjacent the opposite sides of the lower jaw. The axes of the transversely extending surfaces 36 and 38 are coincident. The transversely extending concave surfaces 36 and 38 are substantially on the same radius as the longitudinally extending concave surface 30, except that they extend transversely thereof. The axis of the transverse clamping surface 36—38 of the lower jaw 24 is at right angles to the axis of the transverse surface 32—34 of the upper jaw 22.

Member 20 is provided with a stepped edge 40 opening downwardly, which is the lower portion of the upper jaw. Said stepped edge defines vertical and horizontal surface 41 and 42 respectively. Another stepped edge 44 opening upwardly is formed on the upper portion of the lower jaw 24 and said stepped edge defines vertical and horizontal surfaces 45 and 46 respectively. A transverse opening 48 is provided in the intermediate portion 26 of member 20 for receiving a fastening element, such as an Allen screw or the like.

The member 20′ is an exact duplicate of member 20 and the parts on member 20′ correspond to the same parts on member 20 and are identified by the same numerals primed and are therefore not redescribed. The members 20 and 20′ are secured together in coupled arrangement by means of an Allen bolt and screw, generally indicated at 50, or by any other fastening means adapted to hold same together. The Allen bolt and screw or fastening member 50 is secured in the openings 48 and 48′.

Figures 2, 3, 4:
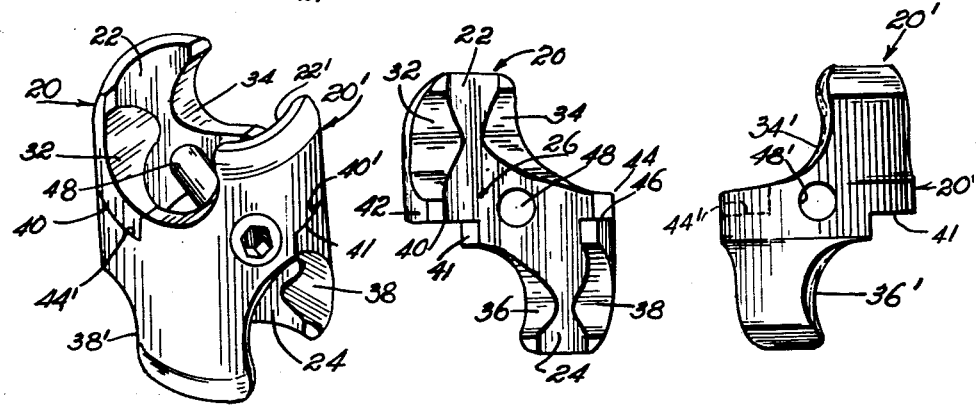
Figure 2 is a view of the members in coupled relationship.
Figure 3 is an inside elevational view of one of the members.
Figure 4 is an outside view of the member shown in Figure 3.

As best shown in Figure 2, the parts are coupled together with the member 20′ opposed to that of member 20, thus the stepped edge 44′ in member 20′ will engage and rest adjacent the stepped edge 40 in member 20 and the stepped edge 40′ of member 20′ will engage and nest adjacent the stepped edge 44 of member 20. When thus coupled together, the coupling unit will provide a pair of cooperating jaws 22 and 22' at one end and another pair of cooperating jaws 24 and 24' at the opposite end, with each cooperating pair of jaws having means for receiving and clamping a tubular member longitudinally of the coupling member, or transversely of the coupling member.

Figure 7:
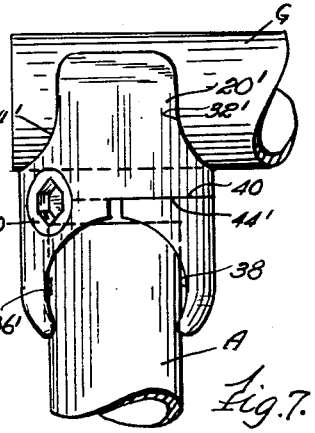
Figure 9:
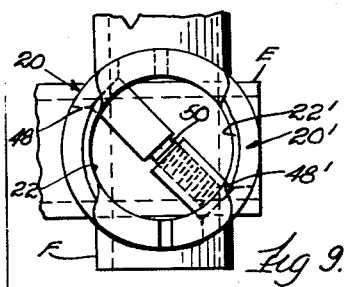
Figure 9 is a view showing particularly the means for securing the members together.
Figure 8:
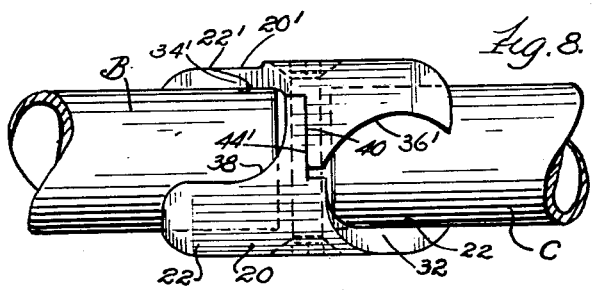

In the lower portion of Figure 7 a tubular member A is shown clamped longitudinally of the coupling member. In Figure 8 two separate tubular members B and C are clamped longitudinally. Tubular member B is clamped between cooperating jaws 22 and 22' and tubular member C is clamped between cooperating jaws 24 and 24'.

To hold the tubular members clamped longitudinally of the coupling member between the jaws 22 and 22', the tubular member is confined within the inner concave longitudinally extending clamping surfaces 28 and 28' thereof, and within the inner concave longitudinally extending clamping surfaces 30 and 30' of the lower jaws 24 and 24'.

Figure 5:
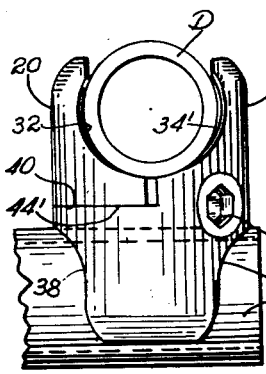
Figures 5, 6, 7 and 8 are views showing tubular members coupled or clamped in various arrangements.
Figure 6:
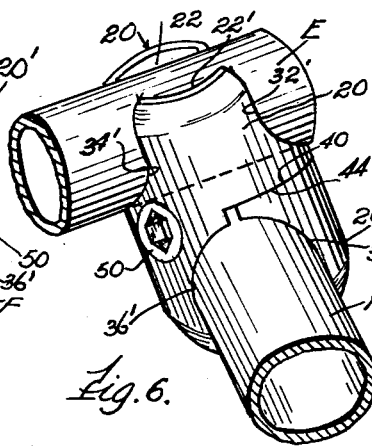

To hold the tubular members D, E, F and G crosswise or transversely of the coupling members, such as shown in Figures 5, 6 and 7, the tubular member is confined within the inner concave transversely extending clamping surfaces of the jaws. For example, the tubular members would be confined between the transversely extending concave surfaces 32 and 34 and 32' and 34' of the cooperating upper jaws 22 and 22' respectively, and the concave surfaces 36—38 and 36'—38' of the cooperating lower jaws 24 and 24' respectively.

As shown in Figure 6, the tubular members E and F are each secured transversely of the coupling unit and as thus secured each can extend through the unit. In Figure 7, tubular member G is secured transversely and the other tubular member A is secured longitudinally. When longitudinally secured, the Allen screw defines the limit to where the tubular member is inserted within the jaws. Figure 8 shows two tubular members B and C, each coupled longitudinally of the coupling member.

It should be clear from the foregoing that the tubular members are susceptible of coupling in various arrangements, with each cooperating pair of jaws at each of the opposite ends permitting coupling longitudinally or transversely of the coupling member.

Figure 11:
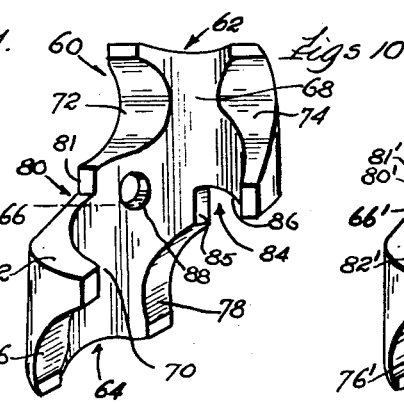
Figure 11 is a side elevational view of the members of Figure 10 in coupled relationship.
Figure 10:
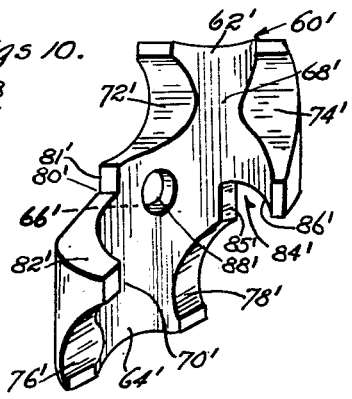
Figure 10 is an exploded view of a modified construction.
Figure 12:
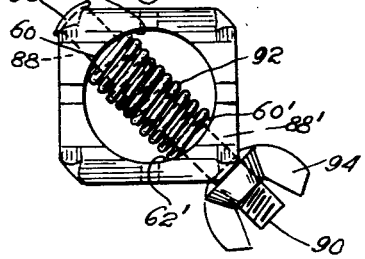
Figure 12 is a top plan view of Figure 11.

In Figures 10 to 12 inclusive is shown a modification of the foregoing. The members 60 and 60' forming the coupling unit are of identical construction, hence only one will be described in detail and the other will have the corresponding parts primed.

The member 60, best shown in perspective in Figure 10, has a body consisting essentially of two jaw members 62 and 64 positioned so that one jaw is substantially at right angles to the other jaw with an intermediate portion 66, all integrally formed. The upper jaw 62, as shown, has an inner concave clamping surface 68 on substantially the same radius as the tubular member to be inserted therein. The concave clamping surface 68 extends longitudinally of member 60 and continues with the intermediate portion 66, as well as the inner concave surface 70 of the lower jaw 64, all of said inner concave surfaces being on substantially the same radius and extending longitudinally of member 60. The axes of said longitudinally extending concave clamping surfaces 68 and 70 are coincident.

The upper jaw 62 also has a pair of spaced concave clamping surfaces 72 and 74 extending transversely of the longitudinally extending concave surface 68 of jaw 62, with each spaced transversely extending concave surface 72 and 74 adjacent the opposite sides of the upper jaw. The axes of the transversely extending surfaces 72 and 74 are coincident. The transversely extending concave surfaces 72 and 74 are substantially on the same radius as the longitudinally extending concave surfaces except that they extend transversely thereof.

The lower jaw 64 likewise has a pair of spaced transversely extending concave clamping surfaces 76 and 78, with each spaced transversely extending concave surface adjacent the opposite sides of the lower jaw 64. The transversely extending concave surfaces 76 and 78 are substantially on the same radius as the longitudinally extending concave surface 70, except that they extend transversely thereof. The axis of the transverse clamping surfaces 76—78 of the lower jaw 64 is at right angles to the axis of the transverse surfaces 72—74 of the upper jaw 62.

The member 60 is provided with a stepped edge opening upwardly and generally indicated at 80, defining vertical and horizontal surfaces 81 and 82 respectively, which is above the lower jaw 64 and another stepped edge generally indicated at 84 having vertical and horizontal surfaces 85 and 86 respectively, which is below the upper jaw 62. A transverse opening 88 is provided in the intermediate portion of member 60 for receiving a fastening bolt or the like. The outer or exposed surface of member 60 is generally flat.

The coupling member 60' is positioned in relation to member 60 so that the stepped edge 80 of member 60 is in engagement with the stepped edge 84' of member 60' and the stepped edge 80' of member 60' is in engagement with the stepped edge 84 of member 60.

A bolt 90 is secured in the openings 88 and 88' and said bolt supports a spiral spring 92 thereon positioned between the members 60 and 60'. A wing nut 94 is secured on the threaded end of the bolt to secure the members together.

This construction, like that shown and described previously, has jaws which clamp the tubular members like that heretofore shown. Each cooperating pair of jaws clamps the tubular member longitudinally or transversely of the unit. The spring member 92 normally urges the members away from each other and holds them in position so that they are in position to be readily applied to a tubular member.

It will be understood that various changes and modifications may be made from the foregoing without departing from the spirit and scope of the appended claims.

I claim:

1. A coupling unit of the character described comprising a pair of members, each of said members having a pair of jaws extending in opposite directions with one jaw substantially at right angles to the other jaw, each said jaw having a longitudinally extending concave clamping surface and a transversely extending concave clamping surface, each said member having a stepped portion to be engaged by the complementary stepped portion of the other member when the two members are secured together in clamping relation, and fastening means for securing said members together.

2. A coupling unit of the character described comprising a pair of members, means for securing said members in clamping position, each of said members having a pair of jaws disposed so that one jaw is substantially at right angles to the other jaw, with the jaws at opposite ends of the member, each jaw having two concave clamping surfaces with one clamping surface of each jaw extending longitudinally of the member and the axes of both of said longitudinally extending surfaces being coincident; the other of said clamping surfaces of each jaw extending transversely of the longitudinal clamping surfaces, with the axis of one transverse clamping surface of one jaw being at right angles to the axis of the other transverse clamping surface of the other jaw.

3. A coupling unit of the character described comprising a pair of members, means for securing said members in clamping position, each of said members having a pair of jaws disposed so that one jaw is substantially at right angles to the other jaw, with the jaws at opposite ends of the member, each jaw having two concave clamping surfaces with one clamping surface of each jaw extending longitudinally of the member and the axes of both of said longitudinally extending surfaces being coincident, the other of said clamping surfaces of each jaw extending transversely of the longitudinal clamping surfaces, with the axis of one transverse clamping surface of one jaw being at right angles to the axis of the other transverse clamping surface of the other jaw, and the axis of each transverse clamping surface intersecting the axis of the longitudinal extending clamping surface of the jaw.

4. In a structure defined in claim 2 in which each of said members has a stepped portion adapted to engage the complementary stepped portion of the other member.

5. In a structure defined in claim 2 in which the means for securing the members in clamping position includes a bolt secured to said members and extending transversely between the members and a coil spring surrounding said bolt and normally urging said members away from each other.

References Cited in the file of this patent

UNITED STATES PATENTS

| | | |
|---|---|---|
| 862,246 | Gutelius | Aug. 6, 1907 |
| 1,931,400 | Williams | Oct. 17, 1933 |
| 1,950,635 | Steinmayer | Mar. 13, 1934 |

FOREIGN PATENTS

| | | |
|---|---|---|
| 361,920 | Italy | Aug. 8, 1938 |
| 1,132,329 | France | Oct. 3, 1955 |